United States Patent [19]

Cain et al.

[11] Patent Number: 5,424,091
[45] Date of Patent: Jun. 13, 1995

[54] NON-TEMPER, CONFECTIONERY FATS

[75] Inventors: Frederick W. Cain, Voorburg, Netherlands; Deryck J. Cebula, Bedford, Great Britain; Adrian D. Hughes, Den Haag; Bettina Schmidl, Alkmaar, both of Netherlands

[73] Assignee: Loders Croklaan B.V., Wormerveer, Netherlands

[21] Appl. No.: 955,594

[22] Filed: Oct. 2, 1992

[30] Foreign Application Priority Data

Oct. 3, 1991 [EP] European Pat. Off. ............ 91309075
Oct. 11, 1991 [GB] United Kingdom ................. 9121578

[51] Int. Cl.⁶ ............................................. A23D 9/00
[52] U.S. Cl. ................................. 426/610; 426/607; 426/660
[58] Field of Search .................... 426/607, 610, 660

[56] References Cited

U.S. PATENT DOCUMENTS

| | | |
|---|---|---|
| 3,492,130 | 1/1970 | Harwood . |
| 4,199,611 | 4/1980 | Toyoshima et al. . |
| 4,276,322 | 6/1981 | Padley ................................ 426/607 |
| 4,364,868 | 12/1982 | Hargreaves . |
| 4,388,339 | 6/1983 | Lomneth et al. . |
| 4,390,561 | 6/1983 | Blain et al. . |
| 4,447,462 | 5/1984 | Tafuri et al. . |
| 4,702,948 | 10/1987 | Wieske et al. . |
| 4,876,107 | 10/1989 | King et al. . |
| 4,882,192 | 11/1989 | Maeda ................................ 426/607 |
| 4,996,074 | 2/1991 | Seiden et al. . |
| 5,023,101 | 6/1991 | Sugihara et al. . |
| 5,104,680 | 4/1992 | Padley et al. . |
| 5,135,769 | 8/1992 | Itagaki ............................... 426/607 |

FOREIGN PATENT DOCUMENTS 0347006 12/1989 European Pat. Off. .
1564363 4/1980 United Kingdom .

OTHER PUBLICATIONS

Swern 1979 Bailey's Industrial Oil & Fat Products vol. 4, fourth edition Wiley Interscience New York pp. 322-323.
Abstract of JP 55034052.
Abstract of JP 55114261.
Derwent Abstract of Ep 23062.
Derwent Abstract of EP 354025.

*Primary Examiner*—Carolyn Paden
*Attorney, Agent, or Firm*—Cushman, Darby & Cushman

[57] ABSTRACT

Fats that consist predominantly of triglycerides, capable of crystallization in the $\beta$-crystal form can be stabilized in their $\beta^1$-crystal form by the external addition of an effective amount of SSO and/or $S_3$-triglycerides (S=sat. fatty acids $C_{10}$–$C_{24}$; O=oleic acid). This way tempering of the fats is no longer required.

3 Claims, No Drawings

NON-TEMPER, CONFECTIONERY FATS

FIELD OF THE INVENTION

Several types of confectionery fats are known. The most sophisticated cocoa butter like of those are triglyceride compositions that require tempering when used in confectionery products. This tempering is meant to transfer the crystal form of the fat components from unstable ($\alpha$ or $\beta^1$) to stable ($\beta$) forms. When tempering and cooling, carried out to solidify the confectionery product is not performed this change in crystal form will proceed in the confectionery product, albeit slowly leading to undesirable phenomena, such as so called blooming of the confectionery product.

Although fats are known that do not need tempering, because the triglycerides easily crystallize directly into their most stable crystal form (usually $\beta^1$), those fats have other disadvantages. Examples of such fats are triglyceride compositions high in trans fatty acids and triglycerides compositions high in lauric fatty acids. The trans acids however are considered as rather unhealthy, whereas the laurics are easily hydrolyzed, resulting in the development of an undesirable taste. Therefore the confectionery industry has already been looking for a long time for confectionery fats that do not need to be tempered, and that do not display the disadvantages of trans and/or lauric fats.

SUMMARY OF THE INVENTION

We have found a solution for the above problem. We have found new fat compositions, that do not need to be tempered and, that do not contain trans acids or lauric fats. Those new fat compositions consist predominantly of triglycerides with more than 50 wt % SOS-type triglycerides that are capable of crystallization in the $\beta$ crystal form, and contain an externally added, minimal working amount of a fat component, capable itself of stabilizing $\beta^1$ crystals, wherein the fat component capable of stabilizing the $\beta^1$ crystals at least comprises a vegetable triglyceride of the SSO-type and/or a triglyceride of the S3-type, also containing an SOO-type triglyceride in such an amount that the weight ratio SSO:SOO is at least 3.0, preferably at least 5.0, while the St:P weight ratio of the total fat composition is less than 1.0, wherein S=saturated fatty acid $C_{10}$-$C_{24}$; O=oleic acid; St=stearic acid; P=palmitic acid and U=unsaturated fatty acid $C_{18}$-$C_{22}$. Any combination of saturated fatty acids can be used for SSO, and similarly for $S_3$.

The main component of those compositions, capable of crystallization in the $\beta$ crystal form is preferably a fat high in POP, in particular more than 50 wt % of POP, more preferably more than 70 wt % of POP is present in this fat (P=palmitic acid). Suitable fats are palm mid fractions, as obtainable from dry- or wet fractionation of palm oil. The most preferred fat is obtained from a double wet fractionation of palm oil.

However, also fats, high in StOSt, in particular more than 50 wt % of StOSt can be stabilized in this way. Examples thereof are cocoa butter, shea and illipe and fractions thereof. Of course also mixtures of fats high in POP and high in StOSt can be stabilized.

DESCRIPTION OF RELATED ART

From U.S. Pat. No. 3,492,130 compositions are known that are temperable to stable triple chain length beta-crystalline forms. These compositions consist of 60–95 wt % of SUS-triglycerides and 40–5 wt % of an equimolecular proportion of triglycerides of the type SUU and SSU (S=sat. $C_{16}$-$C_{18}$, U=unsat. $C_{16}$-$C_{18}$). It is further stated (column 3, lines 28–40) that temperable compositions cannot be obtained, if SUU or SSU are omitted or when small amounts of $S_3$ are added. We have aimed for triglyceride-compositions, capable of crystallisation in the $\beta$-crystal form, that contain small amounts of SSU and/or $S_3$ in order to stabilize them in the $\beta^1$-crystal form. These compositions must have the triglyceride composition according to our invention.

According to EP 23 062 triglycerides compositions are aimed for, which can be used as cocoa butter replacers in amounts up to 100% of the added cocoa butter in chocolate. These compositions should temper under the same conditions as cocoa butter to $\beta$-3 crystals. The triglycerides comprise a blend of 75–99 wt % of SUS[1], and less than 13 wt % of a mixture of SUU and SSU which blend displays an St:P weight ratio of 1.2 to 2. The compositions according to our invention are meant to stabilize the $\beta^1$-crystal form. Herefore, SSU and/or $S_3$ is added, the St:P weight ratio of this additive being less than 1.0.

Structural margarine fats with the composition:
3–9% $S_3$
32–50% SOS
5–12% SSO and
20–32% SSO/SLS are disclosed in EP 78 568.
Our invention does not concern margarine fats. Therefore, our basic triglycerides must contain more than 50 wt % SOS.

In FR 2 334 747 it is disclosed that the solidification rate of fats, e.g. cocoa butter, can be increased by addition of a small amount of a trisaturated triglyceride (tri-stearin according to the examples). Nothing is disclosed about the stabilisation of $\beta^1$-crystals in fats capable of crystallisation in $\beta$-crystal form.

Although the triglyceride, capable of crystallization in the $\beta$ crystal form in general will contain some SSO and/or $S_3$, the amount of SSO and/or $S_3$ is insufficient to stabilize the $\beta^1$ crystal form. Therefore it is necessary to add externally an effective (=minimum working) amount of SSO, $S_3$, or a mixture thereof. The amount of SSO in the total fat composition, so including the naturally occurring SSO-fat, should be at least 8 and at most 40 wt %, preferably 10–20 wt %. The SSO component is preferably derived from palmitic and/or stearic as saturated fatty acids. Useful fats are PPO, as obtainable according to our enzymic process as described in our European patent applications EP 209 327 and EP 496 456 and StStO, as disclosed in our European patent application 91305516. The addition of $S_3$ to amounts from 2 up to 20 wt %, preferably 3–15 wt % based on the total fat composition leads also to improved fats.

DETAILED DESCRIPTION OF INVENTION

In fact we have found that filling fats are in particular improved by the addition of SSO-fats; coating fats are in particular improved by the addition of $S_3$/SSO-combinations. However, this does not mean that incorporation of other fats, within the scope of our invention, does not lead to improvement.

The best results are obtained when in combination with the SSO component also an $S_3$ fat is added to the composition. However the amount of $S_3$ that can be added is limited to maximum 20 wt % (preferably less than 15%); using more than 20 wt % of $S_3$ would lead to unacceptable waxy products. The $S_3$-fat might contain one type of fatty acid, however it is preferred to use $S_3$ of the type S'S"S', wherein S' and S" are both saturated fatty acid with $C_{10}-C_{24}$, however the carbon numbers of S' and S" differ by at least two. An example of such a fat, that can be obtained from the hardening of a palm mid fraction, is PStP. A preferred amount of S'S"S' is 2–10 wt % on total fat (so including any natural occurring $S_3$ as well).

In order to obtain the desired properties of our fat compositions we found that it is advantageous when the POP/SSO—weight ratio of the fat is kept below 6. Very good fat compositions were obtained, when the amounts of SSO and $S_3$ that are added to the basic fat are such, that the N-30-values of the total fat composition, when measured after stabilization and when measured without stabilization meet the requirements of:

$$\frac{N_{30} \text{ (stab)}}{N_{30} \text{ (unstab)}} < 4.0$$

Unstabilized fats were measured after the following regime: melt at 80°C.; 5 mins. at 60°C.; 1 hr at 0°C.; 30 mins at 30°C. Stabilized fats were measured after the following regime: melt at 80°C.; 5 mins at 60°C.; 90 mins at 0°C.; 40 hrs at 26°C.; 90 mins at 0°C.; 60 mins at 30°C.

It is preferred when this ratio is less than 3.0.

The invention also concerns the use of the fat compositions according to the invention as $\beta^1$-stabilized triglyceride compositions.

Also the use of our fat compositions as $\beta^1$-stabilized triglyceride compositions in confectionery filling fat or in confectionery coating fat is part of the invention.

Further non-tempered chocolate compositions, and products made thereof, that contain our new fat compositions are part of our invention. In those chocolate compositions the SSU-content of the fat phase should be more than 12 wt %, preferably more than 15 wt %.

For completeness sake it is disclosed that the product PStP and its use for $\beta^1$ stabilization are known from EP 369 516. The use of this fat for stabilization of $\beta^1$ fat crystals in confectionery fats, i.e. fats with more than 50 wt % of SOS-triglycerides is, however, not disclosed therein. From EP 354.025 it is known that addition of SSU-containing fat compositions (U=unsaturated fatty acid) to hardbutters can improve the bloom behaviour of the hardbutter. However in this last EP-document nothing is disclosed about the addition of the SSU-component to triglycerides that crystallize in the $\beta^1$ crystal form. The SSU is added to e.g. cocoa butter, whereupon the blend is tempered, or to a tempering type hardbutter (New SS-7) or Melano-STS (=trans containing fat), which do not crystallize in the $\beta^1$ crystal form. Moreover, nothing is disclosed about the use of combinations of SSO and $S_3$.

EXAMPLE I

The following fatblends were made:
1. Palm mid fraction (=PMF)
2. PMF+6 wt % $P_3$
3. PMF+6 wt % PStP
4. PMF+9 wt % PStP
5. PMF+6 wt % PStP+12 wt % PPO The particulars of the fats, mentioned above are:
PMF: contains 2% $S_3$ and 70% SOS its FAME being: 55% $C_{16}$; 6% $C_{18:0}$ 33% $C_{18:1}$; 4% $C_{18:2}$; 0.5% $C_{20:0}$ So it consists for about 85% of POP.
PStP: contains 20% $S_3$ other than PStP 80% PStP PPO: contains 6.7% $S_3$; 2% SOS; 77% SSO; 4.5% SSLn; 1% SOO; 8% OSO; 0.5% SOLn SSO consists for 85% of PPO FAME: 0.5% $C_{14}$; 54.8% $C_{16}$; 7.5% $C_{18:0}$; 33.7% $C_{18:1}$; $2C_{18:2}$ $P_3$ was a palm top fraction, containing more than 90 wt % $P_3$ (P=palmitic acid).

Those fat blends were used for the preparation of coatings with the following basic composition:

|  | wt % |
| --- | --- |
| CP 10/12 | 14 |
| Fatblends* | 31 |
| SMP | 7 |
| Sugar | 48 |
| Lecithin | 0.4 |
| Total fat content | 32.5 |
| ratio cocoabutter: fatblend | 5:95 |

For evaluation purposes corks were hand enrobed and bars were moulded with the different coating-compositions. The enrobed corks were passed down a cooling tunnel, using a T-regime of 15° C./10° C./15° C.; total residence time 5 minutes.

The bars were cooled at 13° C. in a static cooling tunnel. $N_{30}$-values, stabilized and unstabilized were measured of the fatblends 1–5 using the standard NMR-technique.

The results mentioned in tables I (=for the Corks) and II (=for the bars) were obtained.

EXAMPLE II

The following fat blends were made:
6. PMF+12 wt % PPO
7. PMF+18 wt % PPO+3 wt % PStP
8. PMF+12 wt % PPO+6 wt % PStP
9. PMF+18 wt % PPO+3 wt % hard stock
10. PMF+18 wt % PPO+3 wt % $P_3$ The same fat components were used as mentioned in Example I.

The hard stock fat, so an $S_3$ type fat, had the following composition: 20% $C_{12}$; 8% $C_{14}$; 24% $C_{16}$; 44% $C_{18:0}$; 0.5% $C_{18:1}$ and 0.5% $C_{18:2}$. Carbon nos.: 4.1% $C_{30}-C_{38}$; 4.1% $C_{40}$; 9.8% $C_{42}$; 12.5% $C_{44}$; 21.4% $C_{46}$; 23% $C_{48}$; 10.6% $C_{50}$; 9% $C_{52}$ and 5.3% $C_{54}$.

Those blends were used in the same way for the preparation of coatings and bars with the same basic composition as given in Example I.

The corks were subjected to the same regime as described in example I.

The products were stored at 20°C., 25° C. and 30° C. and were evaluated. The results are mentioned in tables V–VIII. The bars and corks were also evaluated by subjecting them to a severe T-cycling regime (20°→32° C. every 12 hrs). The results are mentioned in Tables III and IV.

TABLE I

| | EVALUATION OF CORKS | | | | | |
| --- | --- | --- | --- | --- | --- | --- |
| | | condition at | Bloom at 20° C. | | Gloss at 20° C. | |
| Fatblend | $N_{30}$ (S) $N_{30}$ (US) | tunnel end | days | evaluat. | days | evaluat. | |
| 1. | 6.5 | not dry | 0 5 12 19 35 | 5 5 4 3 2 | 0 5 12 19 35 | 3 2 1 1 1 | Criteria: bloom 5 = no bloom 4 = sligth bl. 3 = |

TABLE I-continued

EVALUATION OF CORKS

| Fat-blend | $N_{30}$ (S) $N_{30}$ (US) | condition at tunnel end | Bloom at 20° C. days | eval-uat. | Gloss at 20° C. days | eval-uat. | |
|---|---|---|---|---|---|---|---|
| | | | 55 | 1 | 55 | 1 | bloom 2 = strong bl. 1 = intensive bl. |
| 2. | 3.2 | not dry | 0 | 5 | 0 | 3 | gloss |
| | | | 5 | 5 | 5 | 2 | 5 = very good |
| | | | 12 | 4 | 12 | 2 | 4 = good |
| | | | 19 | 3 | 19 | 1 | 3 = average |
| | | | 35 | 2 | 35 | 1 | 2 = poor |
| | | | 55 | 1 | 55 | 1 | 1 = very poor |
| 3. | 2.1 | dry | 0 | 5 | 0 | 3 | |
| | | | 5 | 5 | 5 | 3 | |
| | | | 12 | 5 | 12 | 2 | |
| | | | 19 | 4 | 19 | 2 | |
| | | | 35 | 3 | 35 | 1 | |
| | | | 55 | 1 | 55 | 1 | |
| 4. | 1.7 | dry | 0 | 4 | 0 | 2 | |
| | | | 5 | 4 | 5 | 2 | |
| | | | 12 | 4 | 12 | 2 | |
| | | | 19 | 4 | 19 | 2 | |
| | | | 35 | 3-4 | 35 | 1 | |
| | | | 55 | 2 | 55 | 1 | |
| 5. | 1.9 | dry | 0 | 5 | 0 | 3 | |
| | | | 5 | 5 | 5 | 3 | |
| | | | 12 | 5 | 12 | 3 | |
| | | | 19 | 5 | 19 | 3 | |
| | | | 35 | 5 | 35 | 3 | |
| | | | 55 | 5 | 55 | 3 | |

TABLE II

EVALUATION OF BARS

| Fat-blend | $N_{30}$ (S) $N_{30}$ (US) | Bloom at 20° C. days | evaluat. | Gloss at 20° C. days | evaluat. |
|---|---|---|---|---|---|
| 1. | 6.5 | 0 | 5 | 0 | 5 |
| | | 7 | 5 | 7 | 1 |
| | | 12 | 4 | 12 | 1 |
| | | 19 | 3 | 19 | 1 |
| | | 35 | 2 | 35 | 1 |
| | | 55 | 1 | 55 | 1 |
| 2. | 3.2 | 0 | 5 | 0 | 5 |
| | | 7 | 5 | 7 | 2 |
| | | 12 | 4 | 12 | 1 |
| | | 19 | 3 | 19 | 1 |
| | | 35 | 3 | 35 | 1 |
| | | 55 | 1 | 55 | 1 |
| 3. | 2.1 | 0 | 5 | 0 | 5 |
| | | 7 | 5 | 7 | 5 |
| | | 12 | 5 | 12 | 5 |
| | | 19 | 5 | 19 | 5 |
| | | 35 | 5 | 35 | 5 |
| | | 55 | 5 | 55 | 5 |
| 4. | 1.7 | 0 | 5 | 0 | 5 |
| | | 7 | 5 | 7 | 5 |
| | | 12 | 5 | 12 | 5 |
| | | 19 | 5 | 19 | 5 |
| | | 35 | 5 | 35 | 5 |
| | | 55 | 5 | 55 | 4 |
| 5. | 1.9 | 0 | 5 | 0 | 5 |
| | | 7 | 5 | 7 | 5 |
| | | 12 | 5 | 12 | 5 |
| | | 19 | 5 | 19 | 5 |
| | | 35 | 5 | 35 | 5 |
| | | 55 | 5 | 55 | 5 |

TABLE III

Evaluation of bars under severe T-cycling regime

| Fat blend | bloom after days | loss of gloss after days |
|---|---|---|
| 6 | 6 | 2 |
| 7 | 22 | 6 |
| 8 | >17 | |
| 9 | 13 | 1 |
| 10 | 7 | 4 |

TABLE IV

Evaluation of corks under severe T-cycling regime

| Fat blend | bloom after days | loss of gloss after days |
|---|---|---|
| 6 | — | — |
| 7 | 22 | 2 |
| 8 | — | — |
| 9 | 12 | 3 |
| 10 | 6 | 3 |

TABLE V

BARS

Bloom

| | 20° C. | | | | 25° C. | | | | 30° C. | | | |
|---|---|---|---|---|---|---|---|---|---|---|---|---|
| Day | 6 | 7 | 9 | 10 | 6 | 7 | 9 | 10 | 6 | 7 | 9 | 10 |
| 0 | 5 | 5 | 5 | 5 | 5 | 5 | 5 | 5 | 5 | 5 | 5 | 5 |
| 1 | 5 | 5 | 5 | 5 | 5 | 5 | 5 | 5 | 5 | 5 | 5 | 5 |
| 2 | 5 | 5 | 5 | 5 | 5 | 5 | 5 | 5 | 5 | 5 | 5 | 5 |
| 3 | 5 | 5 | 5 | 5 | 5 | 5 | 5 | 5 | 5 | 5 | 5 | 5 |
| 4 | 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 5 | 5 |
| 6 | 5 | 5 | 5 | 5 | 5 | 5 | 5 | 5 | 5 | 5 | 5 | 5 |
| 7 | 5 | 5 | 5 | 5 | 5 | 5 | 5 | 5 | 5 | 5 | 5 | 5 |
| 8 | 5 | 5 | 5 | 5 | 5 | 5 | 5 | 5 | 5 | 5 | 5 | 5 |
| 9 | 5 | 5 | 5 | 5 | 5 | 5 | 5 | 5 | 5 | 5 | 5 | 5 |
| 13 | 5 | 5 | 5 | 5 | 5 | 5 | 5 | 5 | 5 | 5 | 5 | 5 |
| 20 | 5 | 5 | 5 | 5 | 5 | 5 | 5 | 5 | 5 | 5 | 5 | 5 |
| 1 month | 5 | 5 | 5 | 5 | 5 | 5 | 5 | 5 | 5 | 5 | 5 | 5 |
| 2 months | 5 | 5 | 5 | 5 | 5 | 5 | 5 | 5 | 5 | 5 | 4 | 4 |
| 3 months | 5 | 5 | 5 | 5 | 4 | 5 | 5 | 5 | 1 | 4/5 | 4 | 4 |
| 4 months | 5 | 5 | ¾ | 5 | 4 | 5 | 4 | 4 | 1 | 4 | 4 | 4 |

TABLE VI

BARS

Gloss

| | 20° C. | | | | 25° C. | | | | 30° C. | | | |
|---|---|---|---|---|---|---|---|---|---|---|---|---|
| day | 6 | 7 | 9 | 10 | 6 | 7 | 9 | 10 | 6 | 7 | 9 | 10 |
| 0 | 5 | 5 | 5 | 5 | 5 | 5 | 5 | 5 | 5 | 5 | 5 | 5 |
| 1 | 5 | 5 | 5 | 5 | 5 | 5 | 5 | 5 | 3 | 5 | 5 | 5 |
| 2 | 5 | 5 | 5 | 5 | 5 | 5 | 5 | 5 | 3 | 5 | 5 | 5 |
| 3 | 5 | 5 | 5 | 5 | 4 | 5 | 5 | 5 | 2 | 5 | 4 | 5 |
| 4 | 5 | 5 | 5 | 5 | 4 | 5 | 4 | 5 | 2 | 5 | ¾ | 5 |
| 5 | 5 | 5 | 5 | 5 | 4 | 5 | 4 | 5 | 2 | 5 | ¾ | 5 |
| 6 | 5 | 5 | 5 | 5 | 3 | 5 | ¾ | 5 | 1 | 5 | ¾ | 5 |
| 7 | 5 | 5 | 5 | 5 | 3 | 5 | 3 | 5 | 1 | 5 | 3 | 3 |
| 8 | 5 | 5 | 5 | 5 | 3 | 5 | 3 | 5 | 1 | 5 | 3 | 3 |
| 9 | 5 | 5 | 5 | 5 | 3 | 5 | 3 | 5 | 1 | 5 | 3 | 3 |
| 13 | 5 | 5 | 5 | 5 | 2 | 5 | 3 | 5 | 1 | 5 | 3 | 3 |
| 20 | 5 | 5 | 5 | 5 | 2 | 5 | 3 | 5 | 1 | 5 | 3 | 3 |
| 1 month | 4 | 4 | 5 | 4 | 2 | 4 | 2 | 4 | 1 | 3 | 2 | 2 |
| 2 months | 4 | 4 | 4 | 4 | 1 | 4 | 1 | 4 | 1 | 3 | 1 | 2 |
| 3 months | ¾ | 4 | ¾ | 4 | 1 | 3 | 1 | 3 | 1 | 1 | 1 | 1 |
| 4 months | ¾ | 4 | ¾ | 4 | 1 | 2 | 1 | 2 | 1 | 1 | 1 | 1 |

TABLE VII

CORKS

Bloom

| | 20° C. | | | | 25° C. | | | | 30° C. | | | |
|---|---|---|---|---|---|---|---|---|---|---|---|---|
| Day | 6 | 7 | 9 | 10 | 6 | 7 | 9 | 10 | 6 | 7 | 9 | 10 |
| 0 | 5 | 5 | 5 | 5 | 5 | 5 | 5 | 5 | 5 | 5 | 5 | 5 |

TABLE VII-continued

| | CORKS Bloom | | | | | | | | | | | |
|---|---|---|---|---|---|---|---|---|---|---|---|---|
| | 20° C. | | | | 25° C. | | | | 30° C. | | | |
| Day | 6 | 7 | 9 | 10 | 6 | 7 | 9 | 10 | 6 | 7 | 9 | 10 |
| 1 | 5 | 5 | 5 | 5 | 5 | 5 | 5 | 5 | 5 | 5 | 5 | 5 |
| 2 | 5 | 5 | 5 | 5 | 5 | 5 | 5 | 5 | 5 | 5 | 5 | 5 |
| 3 | 5 | 5 | 5 | 5 | 4/5 | 5 | 5 | 5 | 4/5 | 5 | 5 | 5 |
| 4 | 5 | 5 | 5 | 5 | 4/5 | 5 | 5 | 5 | 4/5 | 5 | 5 | 5 |
| 5 | 5 | 5 | 5 | 5 | 4/5 | 5 | 5 | 5 | 4/5 | 5 | 5 | 5 |
| 6 | 5 | 5 | 5 | 5 | 4/5 | 5 | 5 | 5 | 4/5 | 5 | 5 | 5 |
| 7 | 5 | 5 | 5 | 5 | 4 | 5 | 5 | 5 | 4 | 5 | 5 | 5 |
| 8 | 5 | 5 | 5 | 5 | 4 | 5 | 5 | 5 | 4 | 5 | 5 | 5 |
| 9 | 5 | 5 | 5 | 5 | 4 | 5 | 5 | 5 | 4 | 5 | 5 | 5 |
| 13 | 5 | 5 | 5 | 5 | 4 | 5 | 5 | 5 | 4 | 5 | 5 | 5 |
| 20 | 5 | 5 | 5 | 5 | 4 | 5 | 5 | 5 | 4 | 5 | 5 | 5 |
| 1 month | 5 | 5 | 5 | 5 | 4 | 5 | 5 | 5 | 4 | 5 | 5 | 5 |
| 2 months | 5 | 5 | 5 | 5 | 4 | 4 | 4 | 5 | 4 | 4 | 4 | 5 |
| 3 months | 4 | 5 | 4 | 4/5 | 3 | 4 | 4 | 4 | 1 | 4 | 1 | 1 |
| 4 months | 4 | 5 | ¾ | 4 | 3 | 4 | 4 | 4 | 1 | 4 | 1 | 1 |

TABLE VIII

| | CORKS Gloss | | | | | | | | | | | |
|---|---|---|---|---|---|---|---|---|---|---|---|---|
| | 20° C. | | | | 25° C. | | | | 30° C. | | | |
| day | 6 | 7 | 9 | 10 | 6 | 7 | 9 | 10 | 6 | 7 | 9 | 10 |
| 0 | 4 | 4 | 3 | 4 | 4 | 4 | 3 | 4 | 4 | 4 | 3 | 4 |
| 1 | 3 | 4 | 3 | 4 | 3 | 4 | 3 | 4 | 3 | 3 | 3 | 4 |
| 2 | 3 | 4 | 3 | 4 | 3 | 4 | 3 | 4 | 3 | 3 | 3 | 4 |
| 3 | 3 | 4 | 3 | 4 | 1 | 4 | 2 | 4 | ½ | 3 | 2 | 4 |
| 4 | 3 | 4 | 3 | 4 | 1 | 4 | 2 | 4 | 1 | 3 | 2 | 4 |
| 5 | 3 | 4 | 3 | 4 | 1 | 4 | 2 | 4 | 1 | 3 | 2 | 4 |
| 6 | 3 | 4 | 3 | 4 | 1 | 4 | 2 | 4 | 1 | 3 | 2 | 4 |
| 7 | ¾ | 4 | 3 | 4 | 1 | 4 | 2 | 4 | 1 | 3 | 2 | 4 |
| 8 | ⅔ | 4 | 3 | 4 | 1 | 4 | 2 | 4 | 1 | 3 | 2 | 4 |
| 9 | ⅔ | 4 | 3 | 4 | 1 | 4 | 2 | 4 | 1 | 3 | 2 | 4 |
| 13 | 2 | 4 | 3 | 4 | 1 | 4 | 2 | 4 | 1 | 3 | 2 | 4 |
| 20 | 2 | 4 | 3 | 4 | 1 | 3 | 2 | 3 | 1 | 3 | 2 | 3 |
| 1 month | 2 | 4 | 2 | 4 | 1 | 2 | 1 | 2 | 1 | 2 | 1 | 2 |
| 2 months | 2 | 3 | 2 | 3 | 1 | 1 | 1 | 1 | 1 | 2 | 1 | 2 |
| 3 months | 1 | 2 | 1 | 2 | 1 | 1 | 1 | 1 | 1 | 1 | 1 | 2 |
| 4 months | 1 | 2 | 1 | 2 | 1 | 1 | 1 | 1 | 1 | 1 | 1 | 1 |

We claim:

1. Non-temper fat composition consisting predominantly of triglycerides with more than 50 wt % SUS-type triglycerides, that are capable of crystallization in the $\beta$ crystal form, and an externally added, minimal working amount of a fat component, capable of stabilizing $\beta^1$ crystals, said externally added fat being a vegetable triglyceride of the SSO-type and some triglyceride of the SSS-type, also containing an SOO-type triglyceride in such an amount that the weight ratio SSO:SOO is at least 3.0, while the St:P weight ratio of the total fat composition is less than 1.0, wherein S=sat fatty acids $C_{10}$–$C_{14}$; O=oleic acid; St=stearic acid; P=palmitic acid and U=unsaturated fatty acid $C_{18}$–$C_{22}$, whereas any combination of saturated fatty acids can be present in SSO and SSS, said externally added fat component functioning to stabilize the SUS-type triglycerides in the $\beta^1$ crystal form rather than the $\beta$ form without tempering wherein the triglyceride capable of crystallization in $\beta$-crystal form is a fat with more than 50 wt % POP (P=palmitic).

2. Non-temper fat composition according to claim 1, wherein the fat high in POP is a palm mid fraction.

3. Non-temper fat composition consisting predominantly of triglycerides with more than 50% SUS-type triglycerides, that are capable of crystallization in the $\beta$ crystal form, and an externally added, minimal working amount of a fat component, capable of stabilizing $\beta^1$ crystals, said externally added fat being a vegetable triglyceride of the SSO-type and some triglyceride of the SSS-type, also containing an SSO-type triglyceride in such an amount that the weight ratio SSO:SOO is at least 3.0, while the St:P weight ratio of the total fat composition is less than 1.0, wherein S=sat fatty acids $C_{10}$–$C_{24}$; O=oleic acid; St=stearic acid; P=palmitic acid and U=unsaturated fatty acid $C_{18}$–$C_{22}$, whereas any combination of saturated fatty acids can be present is SSO and SSS, said externally added fat component functioning to stabilize the SUS-type triglycerides in the $\beta^1$ crystal form rather than the $\beta$ form without tempering, wherein the triglyceride capable of crystallization in $\beta$-crystal form is a fat with more than 50 wt % StOSt (St=stearic comprising shea fractions, Illipe fractions and cocoa butter fractions.

* * * * *